US009965223B2

(12) United States Patent
Dube et al.

(10) Patent No.: US 9,965,223 B2
(45) Date of Patent: *May 8, 2018

(54) SYSTEMS AND METHODS FOR SCALABLE STORAGE MANAGEMENT

(71) Applicant: Dell Products L.P., Round Rock, TX (US)

(72) Inventors: Shawn Joel Dube, Austin, TX (US); Tim Lambert, Austin, TX (US); Surender V. Brahmaroutu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/167,297

(22) Filed: May 27, 2016

(65) Prior Publication Data

US 2016/0274798 A1 Sep. 22, 2016

Related U.S. Application Data

(63) Continuation of application No. 12/473,180, filed on May 27, 2009, now Pat. No. 9,377,967.

(51) Int. Cl.
*G06F 3/06* (2006.01)
*G06F 13/12* (2006.01)

(52) U.S. Cl.
CPC .......... *G06F 3/0662* (2013.01); *G06F 3/0658* (2013.01); *G06F 3/0664* (2013.01); *G06F 3/0683* (2013.01); *G06F 13/12* (2013.01); *G06F 3/0607* (2013.01); *G06F 3/0629* (2013.01); *G06F 3/0689* (2013.01)

(58) Field of Classification Search
CPC .... G06F 3/0607; G06F 3/0629; G06F 3/0658; G06F 3/0662; G06F 3/0683; G06F 3/0689; G06F 13/12; G06F 3/0664
See application file for complete search history.

(56) References Cited

U.S. PATENT DOCUMENTS

| 5,898,396 | A  | 4/1999 | Shimomura et al. ......... 341/163 |
| 7,096,300 | B2 | 8/2006 | Sivertsen ...................... 710/305 |
| 7,487,283 | B2 | 2/2009 | Sivertsen ...................... 710/306 |
| 7,685,329 | B1 | 3/2010 | Sivertsen ....................... 710/15 |

(Continued)

OTHER PUBLICATIONS

"Management Component Transport Protocol (MCTP)"; Distributed Management Task Force, Inc. (DMTF), Version 1.0.0a; 15 pages, Jul. 2007.

(Continued)

*Primary Examiner* — Thomas J Cleary
(74) *Attorney, Agent, or Firm* — Baker Botts L.L.P.

(57) ABSTRACT

Systems and methods for management of scalable storage architectures are disclosed. The system includes one or more storage backplanes, each storage backplane configured to interface with one or more hard disk drives. The system includes a baseboard management controller, which includes an interface to communicate with one or more of the storage backplanes and programmable logic configured to detect the presence of one or more hard disk drives in an interfaced storage backplane and control one or more status indicators, wherein each status indicator is related to at least one of the hard disk drives in the interfaced storage backplane.

20 Claims, 4 Drawing Sheets

(56) References Cited

U.S. PATENT DOCUMENTS

| | | |
|---|---|---|
| 2003/0046470 A1 | 3/2003 | Sivertsen ............... 710/304 |
| 2003/0191836 A1* | 10/2003 | Murtha .............. H04L 67/125 |
| | | 709/224 |
| 2006/0080359 A1 | 4/2006 | Powell et al. |
| 2006/0080471 A1 | 4/2006 | Powell et al. |
| 2006/0149881 A1 | 7/2006 | Clayton et al. ............ 710/302 |
| 2006/0174085 A1 | 8/2006 | Wu et al. |
| 2006/0194460 A1 | 8/2006 | Chen et al. ................ 439/108 |
| 2006/0235937 A1 | 10/2006 | Wu et al. |
| 2006/0277328 A1 | 12/2006 | Cherian et al. |
| 2007/0050538 A1 | 3/2007 | Northcutt et al. |
| 2007/0168609 A1 | 7/2007 | Ali |
| 2008/0003845 A1 | 1/2008 | Hong et al. ................. 439/67 |
| 2008/0126851 A1 | 5/2008 | Zadigian et al. |
| 2008/0313312 A1 | 12/2008 | Flynn et al. ............... 709/221 |

OTHER PUBLICATIONS

Chow, Ivy, "SAS Expander FPGA Emulation," Simon Fraser University; 63 pages, 2005.

\* cited by examiner

SYSTEMS AND METHODS FOR SCALABLE STORAGE MANAGEMENT

CROSS-REFERENCE TO RELATED APPLICATION

This application is a continuation of application Ser. No. 12/473,180 titled "System and Method for Scalable Storage Management," filed May 27, 2009, which is incorporated herein by reference.

TECHNICAL FIELD

The present disclosure relates generally to the operation of computer systems and information handling systems, and, more particularly, to systems and methods for managing data storage systems.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include a hard disk drive backplane, such as that shown in FIG. 1. Backplane 105 includes 8 hard disk drives $110_{1 \ldots 8}$ a storage enclosure processor (SEP) 115 manages the detection of the hard disk drives $110_1 \ldots$ and the operation of LEDs of the backplane 105. SEPs are typically custom components that support a fixed number of hard disk drives. For example, the SEP 115 shown in FIG. 1 supports eight hard disk drives. If the backplane supports fewer drives, then there is wasted capacity of the SEP 115. If the backplane contained more drives, additional storage enclosure processors would be necessary. SEPs, such as SEP 115, typically require their own computing intelligence (e.g., a processor) and memory (e.g., one or both of RAM and ROM). SEPs are generally configured to communicate with other portions of the information handling system 100 with point-to-point signaling. Any device that needs to get information from the SEP or convey information to the SEP must be directly connected to the SEP.

To address the limitations, approaches to drive management using multiple SEPs have been proposed. These solutions, however, tend to increase the pin count and cost of the backplanes. Therefore, a need exists to maintain the functionality provided by SEPs in a more scalable architecture.

SUMMARY

In accordance with the present disclosure, systems and methods for management of scalable storage architectures are disclosed. The system includes one or more storage backplanes, each storage backplane configured to interface with one or more hard disk drives. The system includes a baseboard management controller, which includes an interface to communicate with one or more of the storage backplanes and programmable logic configured to detect the presence of one or more hard disk drives in an interfaced storage backplane and control one or more status indicators, wherein each status indicator is related to at least one of the hard disk drives in the interfaced storage backplane.

The systems and methods disclosed herein are technically advantageous because of the potential for scalability. Once the functionality of the storage enclosure processors is moved to the baseboard management controller, the former constraints as to number of drives that can be managed by a storage enclosure processor are removed. Other technical advantages include cost effectiveness, as the baseboard management controller is an existing component that can be used in place of the storage enclosure processor. Yet another technical advantage is upgradeability of the system. Other technical advantages will be apparent to those of ordinary skill in the art in view of the following specification, claims and drawings.

BRIEF DESCRIPTION OF THE DRAWING

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
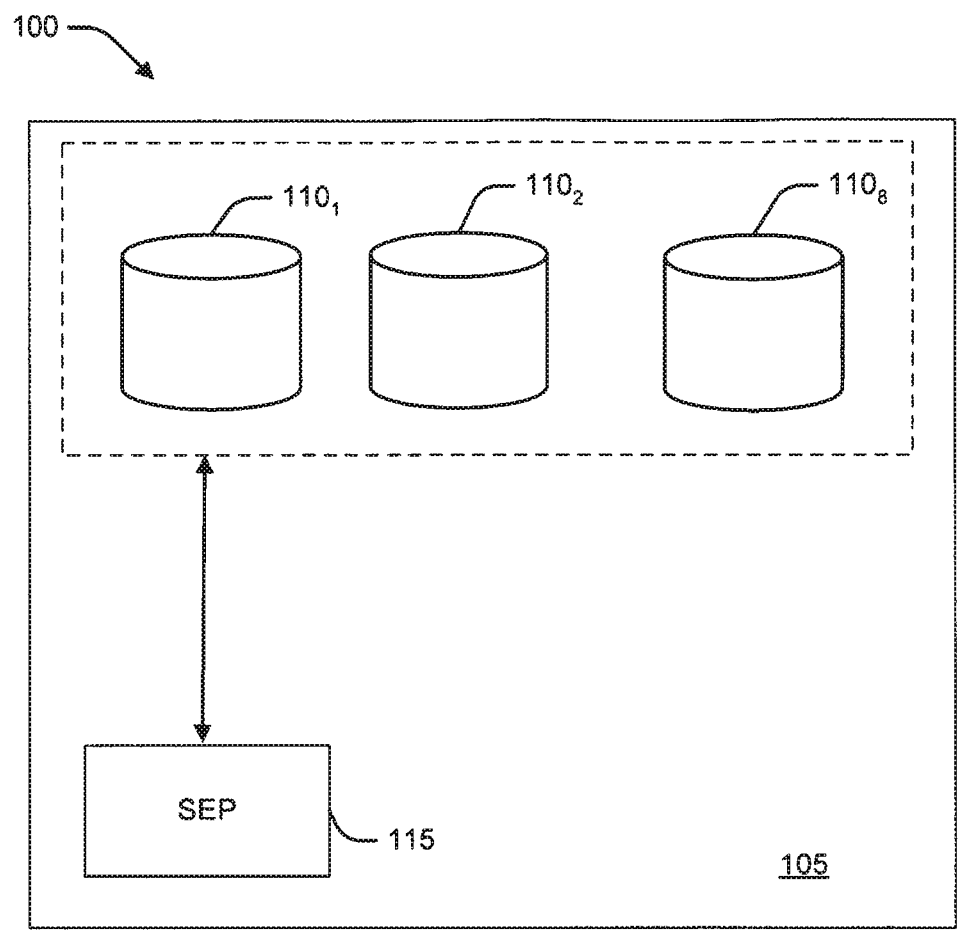
FIG. 1 is a block diagram of a hard disk drive backplane with a storage enclosure processor.
Figure 2:
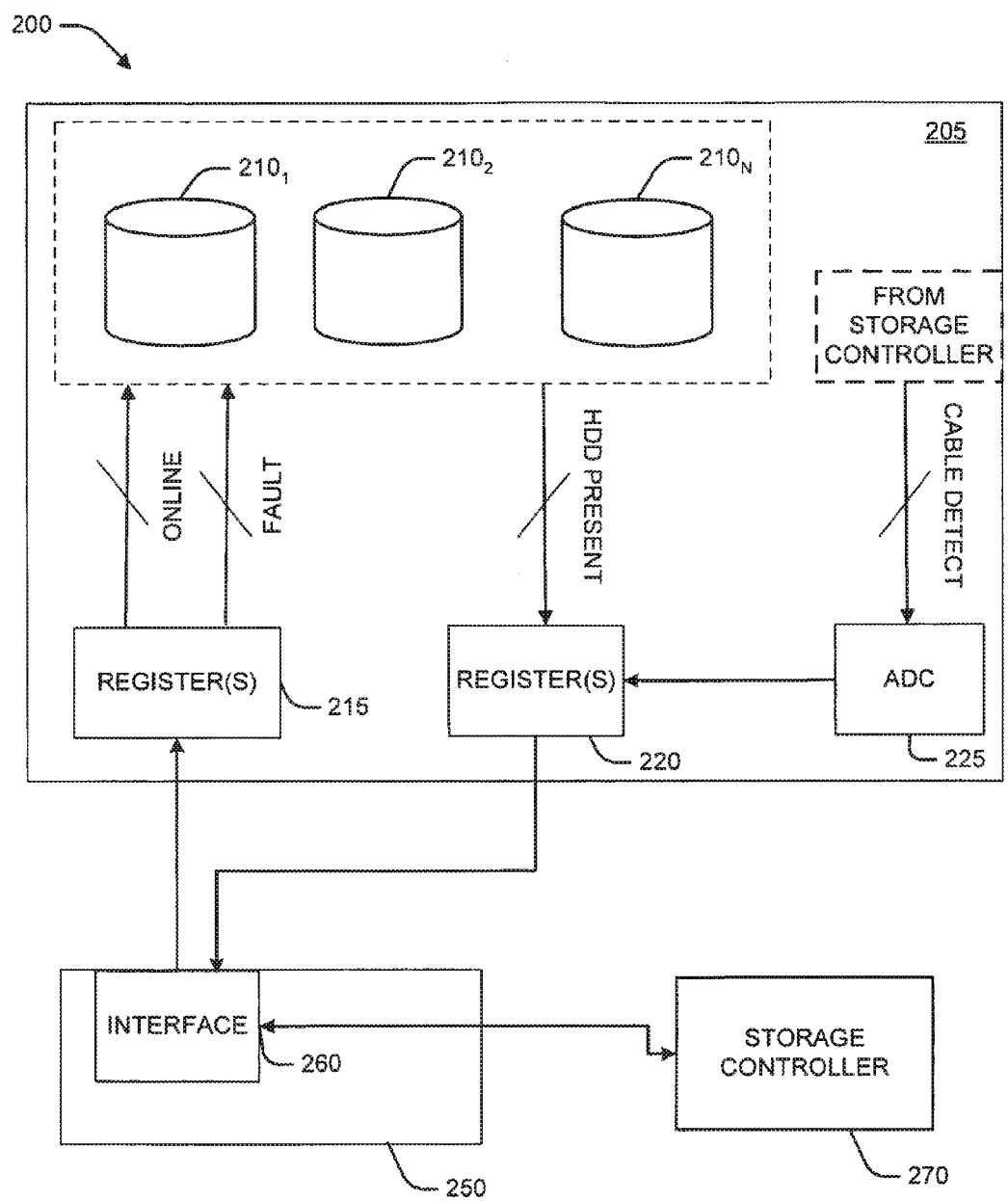
FIGS. 2-4 are block diagrams of example information handling systems according to the present disclosure.

FIG. 2 shows an information handling system 200 according to the present invention. The information handling system 200 includes one or more storage backplanes, such as storage backplane 205. Storage backplane 205 is configured to interface with one or more hand disk drives, such as had disk drives 210$_{1...N}$.

The information handling system 200 includes a baseboard management controller 250. In general, the baseboard management controller 250 includes programmable logic to receive signals from one or more sensors. Example sensors include temperature sensors, fan speed sensors, power mode sensors, and operating system status sensors. In certain example implementations, baseboard management controller 250 stores the status of devices in the information handling system 200. For example, the baseboard management controller 250 may receive and store one or more speeds from one or more cooling fans in the system. Certain example implementations of baseboard management controller 250 perform actions based, at least in part, on values received from the sensors. For example, the baseboard management controller 250 may alert a system administrator when a temperature from a temperature sensor is outside of a range of acceptable temperatures. Example implementation of the baseboard management controller 250 may implement, at least partially, one or more versions of the Intelligent Platform Management Interface specification. In certain example implementations, the baseboard management controller 250 is physically separate from the storage backplane 205.

Figure 4:
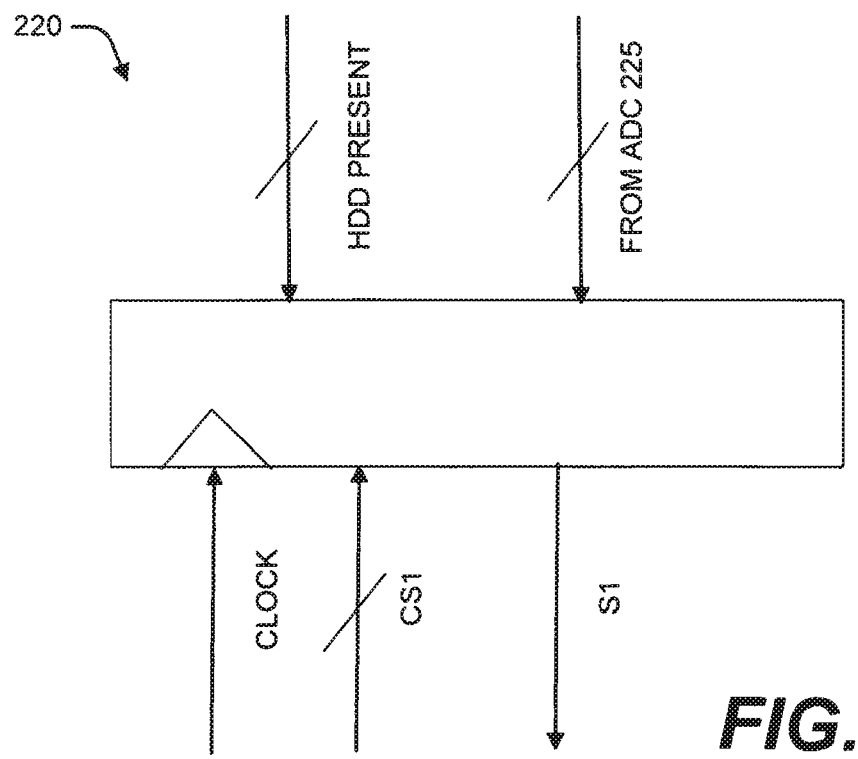

To that end, the programmable logic of the baseboard management controller 250 includes programmable logic that is configured to determine the presence of hard drives in the storage backplane 205. Certain example implementations of the programmable logic of the baseboard management controller 250 determine the presence of hard drives in the storage backplane 205 by receiving a disk drive present signal corresponding to one of had disk drives 210$_{1...N}$. As shown in FIG. 2, the hard disk drive present signals originate in the storage backplane 205. The interface 260 controls the register 220 to select one of the hard disk drive present signals. FIG. 4 shows an example implementation of register 220. The example register 220 is a serial-in parallel-out shift register. The interface 260 in the baseboard management controller 250 selects which hard disk drive present line it wants to read by setting the CS0 line and clocking the clock line. The interface 260 can then read the selected hard disk drive present line from output S0 of the register 220. Certain example implementations include a plurality of shifters concatenated to accommodate a greater number of hard disk drive present lines. Example implementations of register 220 feature the ability to read from 8, 16, 32, or more hard disk drive present lines. This is useful, for example, in backplanes that are configured to interface with a large number of hard disk drives. In addition to hard disk drive present lines, the interface 260 may select to receive the value of a cable select line. The cable select lines are read from a storage controller, such as storage controller 270. Certain example implementations of the information handling system 200 include analog to digital conversion (ADC) logic 225. The ADC logic detects the difference in values in pull down resistors and generates a digital signal. In the implementation shown in FIGS. 2 and 4, the output of the ADC logic 225 is output to the register 220, where is can be selected by the interface 260. Other implementations, however, feature a separate register (or set of registers concatenated together) for the cable select signals. Implementations of the baseboard management controller 250 determine the values of the hard disk drive present signals and cable detect signals, by causing the interface 260 to set the appropriate values of CS1 to read the desired signal. After the signal is read, the baseboard management controller 250 stores the retrieved signal values in memory so they are available for later retrieval.

In certain implementations, the programmable logic of the baseboard management controller 250 is a microprocessor. The microprocessor may have onboard memory or the microprocessor may interface with external memory. In another implementation, the programmable logic is a general purpose processor that executes command to implement the functionality of the baseboard management controller. These commands are stored, for example, in non-volatile memory. In one implementation, the baseboard management controller 250 includes memory to store information received by the baseboard management controller 250, such as the status of devices in the information handling system. By way of example, the presence of certain one of hard disk drives 210$_{1...N}$ in the storage backplane 205 is stored in memory by the baseboard management controller 250. In certain example implementations, the hard disk drive present signals are received at the baseboard management controller 250 by an interface 260, which is described in greater detail below.

In one implementation, the baseboard management controller 250 configured to implement the functionality of an SEP, communicates with the storage controller 270 using the Storage Enclosure Services protocol. In this implementation, the placement of SEP functionality in the baseboard management controller 250 is transparent to the storage controller 270, because the functionality performed by the baseboard management controller 250 mirrors the functionality of a SEP, without the need for the SEP hardware.

In general, the interface 260 enables communication between one or more storage backplanes 205 and the baseboard management controller 250. Example implementations of the interface 260 include a hardware based serial general purpose input/output (GPIO) interface. Example implementations of interface 260 also communicate with storage controller 270. In one implementation, communication with storage controller 270 is performed using out-out-band signaling. For example, the communication between storage controller 270 and baseboard management controller 250 may be performed over a point-to-point connection using the I2C protocol. In other implementations, communications between storage controller 270 and the baseboard management controller 250 is performed over a in-band communication channel. In one example implementation, the baseboard management controller 250 and the storage controller 270 are connected by a PCI Express bus. In such an implementation, communications between the baseboard management controller 250 and the storage controller 270 flow though one or more of a PCI Express chipset, a switch, or a CPU. In one example implementation, the baseboard management controller 250 and the storage controller 270 communicate over the PCI Express bus using the Management Component Transport Protocol (MCTP). When the baseboard management controller 250 is connected to the information handling system 100 using a bus (such as the PCI Express bus described above) various components of the information handling system 200 can interact with the baseboard management controller 250 to, for example, retrieve data about the presence of attached hard disk drives $210_1 \ldots _N$. In one example implementation, the information handling system includes a plurality of storage controllers, each of which can communicate with the baseboard management controller 250.

The storage controller 250 generally control the storage subsystem of information handling system 200. In one implementation, the storage controller 270 is embedded in a motherboard of the information handling system 200. In other example implementation, the storage controller 270 is host bus adapter (HBA) controller card. In still other implementations, the information handling system 200 includes a plurality of storage controllers 270, where at least two of the storage controller 270 are in communication with the baseboard management controller 250.

The information handling system 200 includes one or more status indicators. In certain example implementations, these status indicators are lights on the backplane 205. In one example implementation, the status indicators are a set of LEDs that indicate, for each hard disk drive $210_1 \ldots _N$ is online and whether that hard disk drive has a fault. Other example information handling systems 200 use different illumination devices or other status indication devices such as speakers. In one example implementation, there are two LEDs for each hard disk drive $210_1 \ldots _N$. Other implementations use a different number of LEDs. In another example implementation, a single LED is used for each of hard disk drives $210_1 \ldots _N$ to indicate both whether the drive is online or in a fault state. Such an LED may have the ability to display two colors depending on state.

Figure 3:
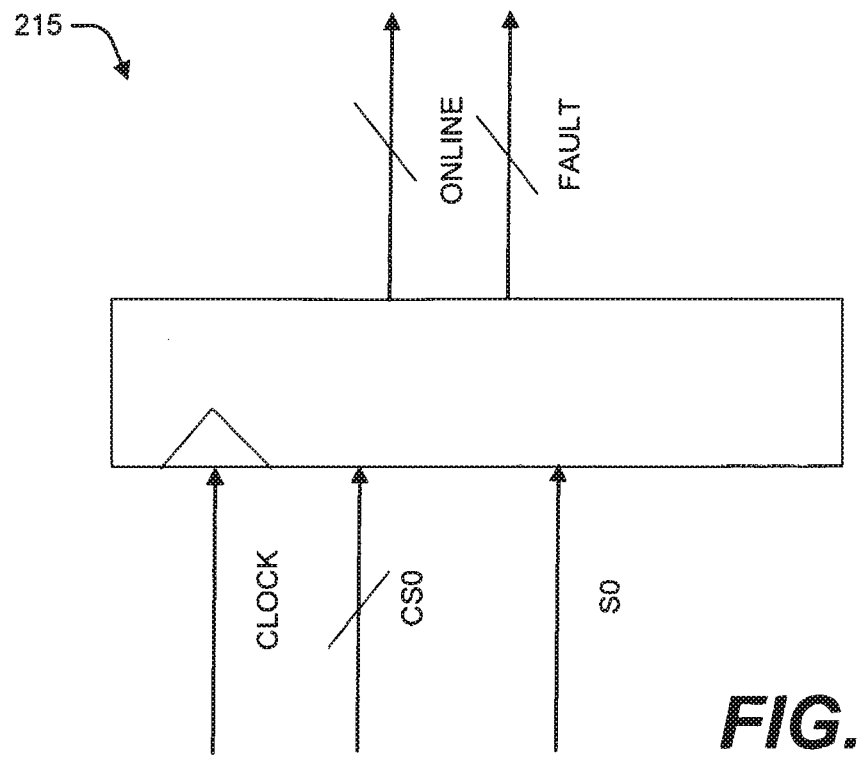

In one example implementation, the baseboard management controller 250 is configured to operate the hard disk drive status indicators (e.g. online LED and fault LED). The baseboard management controller 250 includes programmable logic to determine which indicators should be illuminated. In one example implementation, the baseboard management controller 250 receives input from other components in the information handling system 270 to determine whether one or more of the indicators should be illuminated. In other implementations, the baseboard management controller 250 determines whether one or more indicators should be illuminated based on information stored in the memory of baseboard management controller 250 or based on information gathered by baseboard management controller 250. Once the baseboard management controller 250 has determined which indicators should or should not be illuminated, it send a signal via interface 260 to the backplane 205 to set the status of an LED. In particular, the interface 260 operates one or more registers 215 so that the signal is properly directed to cause an LED to be illuminated or not illuminated. An example of register 215 is shown in greater detail in FIG. 3. The example register 215 is a serial-in parallel-out shift register. The interface 260 specifies an address for the signal to be sent (CS0) and a value to be sent (S0). The example register 215 receives a clock signal from the interface 260. The example register 215 also receives a CS0 address and an S0 value. In certain example implementations, register 215 is formed by concatenating multiple shifters. This may advantageously allow for the control of 8, 16, 32, or more indicators.

In one example implementation, register 215 and register 220 may share a common sync, as opposed to separate chip select lines CS0 and CS1. In such an implementation, S0 and S1 would simultaneously shift.

Figure 5:
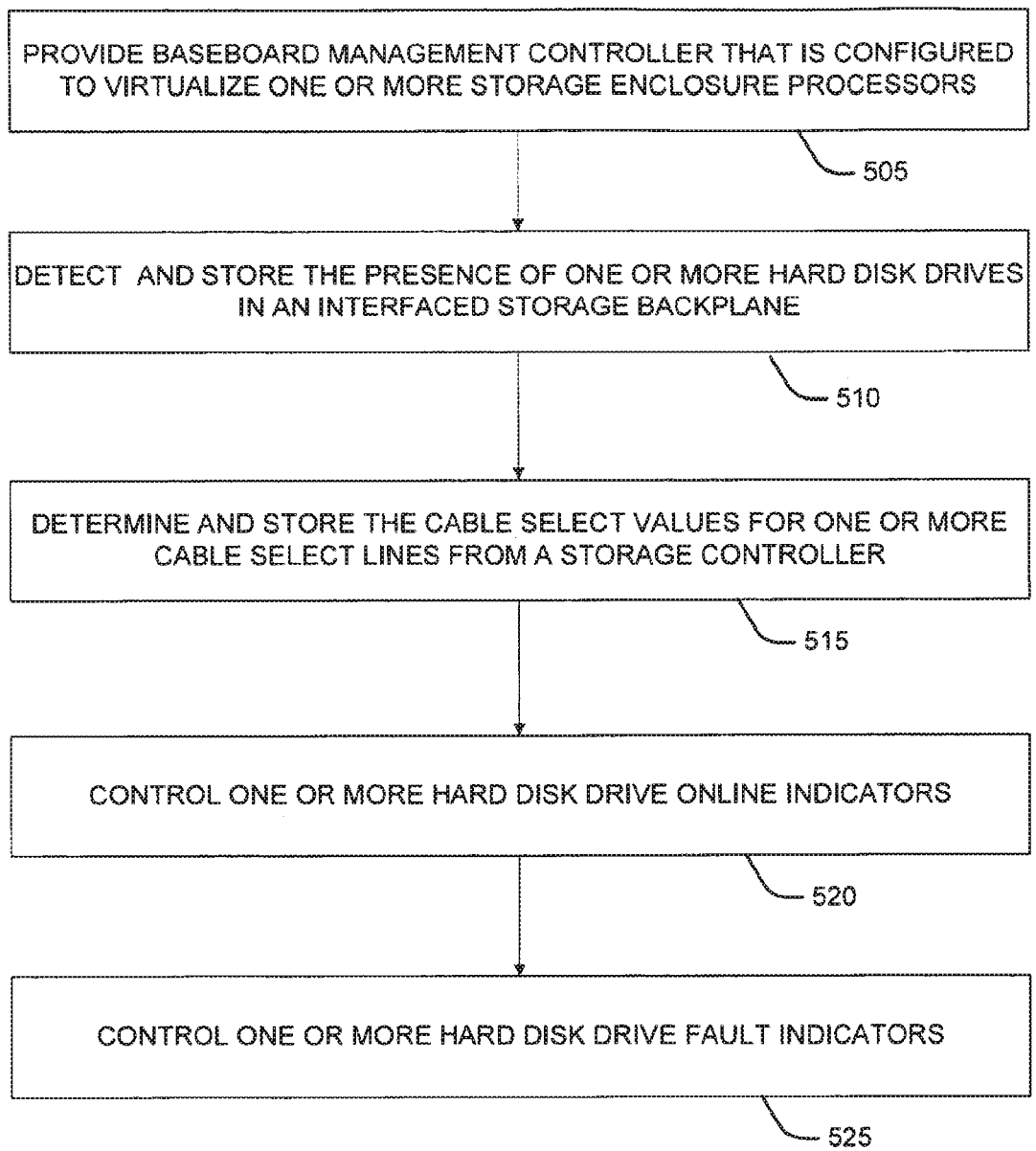
FIG. 5 is a flow chat of an example method of the present disclosure.

FIG. 5 illustrates an example method according to the present invention. A baseboard management controller 250 is provided, where the baseboard management controller 250 is configured to virtualize one or more storage enclosure processors (block 505). In one example embodiment, the baseboard management controller 250 provides the functionality that would be provided by a storage enclosure processor on the backplane 205. The baseboard management controller 250 detects and stores the presence status of one or more hard disk drives $210_1 \ldots _N$ in a storage backplane that is interfaced to the baseboard management controller 250 (block 510). In certain example implementations, block 510 may be performed on a regular basis. In other example implementations, it may be performed when certain conditions are met or on demand. The baseboard management controller 250 detects and stores one or more cable select statuses from a storage controller 270 that is interfaced to the baseboard management controller 250 (block 515). In certain example implementations, block 515 may be performed on a regular basis. In other example implementations, it may be performed when certain conditions are met or on demand. The baseboard management controller 250 controls one or more hard disk drive ready indicators (block 520). The baseboard management controller 250 controls one or more hard disk drive fault indicators (block 525). In one implementation, blocks 520 and 525 are preformed regularly (e.g., roughly once per an amount of time). In other implementations they are perfumed in response to certain conditions or on demand. Although the indicators are described above as "online" and "ready" indicators in example implementations they ended a number of HDD states though combinations of blink patterns. Certain example implementations cause one or more indicators to blink according a pattern to indicate a particular status.

Although the present disclosure has been described in detail, it should be understood that various changes, substitutions, and alterations can be made hereto without departing from the spirit and the scope of the invention as defined by the appended claims. Various changes, substitutions, and alterations can be made to interfaces with multiple devices at one end and a single device at the other end without departing from the spirit and the scope of the invention.

What is claimed is:

1. An information handling system comprising:
    one or more storage controllers coupled to one or more cable select lines;
    a plurality of storage backplanes, each storage backplane configured to interface with one or more hard disk drives; and
    a baseboard management controller coupled to the one or more storage controllers, wherein the baseboard management controller comprises a virtualized storage enclosure processor, and wherein the baseboard management controller includes:
        an interface to communicate with the at least two storage backplanes, wherein the interface receives a value of the one or more cable select lines; and
    a processor that executes one or more commands to:
        communicate with at least one of the one or more storage controllers using a storage enclosure services protocol;
        detect and store a status associated with each of the one or more cable select lines, wherein the status is received from one or more of the one or more storage controllers;
        detect the presence of one or more hard disk drives in an interfaced storage backplane by accessing a first register communicably coupled to the interfaced storage backplane; and
        send an alert based, at least in part, on the status.

2. The information handling system of claim 1, further comprising:
wherein at least one of the one or more of storage controllers communicate with the baseboard management controller by in-band signaling.

3. The information handling system of claim 1, further comprising:
control one or more status indicators through a second register communicably coupled to the interfaced storage backplane, wherein each status indicator is related to at least one of the one or more hard disk drives in the interface storage backplane, and wherein the first register and the second register share a common sync.

4. The information handling system of claim 1, wherein the processor further executes the one or more commands to:
communicate with at least one of the one or more storage controllers using the Management Component Transport Protocol.

5. The information handling system of claim 1, wherein the interface to communicate with one or more of the plurality of storage backplanes comprises a serial general input/output interface.

6. The information handling system of claim 1, wherein the processor further executes the one or more commands to:
control, by the interface, a register to select one or more hard disk present signals; and
read and store the selected one or more hard disk present signals.

7. The information handling system of claim 1, wherein the processor further executes the one or more commands to:
control the operation of an online LED, wherein the online LED is indicative of a state of one or more hard disk drives in one of the storage backplanes.

8. The information handling system of claim 1, wherein the processor further executes the one or more commands to:
control the operation of a fault LED, wherein the fault LED is indicative of a state of one or more hard disk drives in one of the storage backplanes.

9. The information handling system of claim 1, wherein the value of the one or more cable select lines is received from the one or more storage controllers.

10. A baseboard management controller for managing a plurality of storage backplanes each storage backplane configured to interface with one or more hard disk drives, the baseboard management controller comprising:
a virtualized storage enclosure processor;
an interface to the plurality of storage backplanes; and
a processor that executes one or more commands to:
communicate with at least one of one or more storage controllers using a storage enclosure services protocol;
receive, by the interface, a value of one or more cable select lines;
detect and store a status associated with each of the one or more cable select lines, wherein the status is received from one or more of the one or more storage controllers;
detect the presence of one or more hard disk drives in an interfaced storage backplane by accessing a first register communicably coupled to the interfaced storage backplane; and
send an alert based, at least in part, on the status.

11. The baseboard management controller of claim 10, wherein at least one of the one or more of the storage controllers communicate with the baseboard management controller by in-band signaling.

12. The baseboard management controller of claim 10, wherein the processor further executes the one or more commands to:
control one or more status indicators through a second register communicably coupled to the interfaced storage backplane, wherein each status indicator is related to at least one of the one or more hard disk drives in the interfaced storage backplane, and wherein the first register and the second register share a common sync.

13. The baseboard management controller of claim 10, wherein the processor further executes the one or more commands to:
communicate with at least one of the one or more of the storage controllers using the Management Component Transport Protocol.

14. The baseboard management controller of claim 10, wherein the interface to communicate with one or more of the storage backplanes comprises a serial general input/output interface.

15. The baseboard management controller of claim 10, wherein the processor further executes the one or more commands to:
control, by the interface, a register to select one or more hard disk present signals; and
read and store the selected one or more hard disk present signals.

16. The baseboard management controller of claim 10, wherein the processor further executes the one or more commands to:
control the operation of an online LED, wherein the online LED is indicative of a state of one or more hard disk drives in one of the storage backplanes.

17. The baseboard management controller of claim 10, wherein the processor further executes the one or more commands to:
control the operation of a fault LED, wherein the fault LED is indicative of a state of one or more hard disk drives in one of the storage backplanes.

18. The baseboard management controller of claim 10, wherein the value of the one or more cable select lines is received from the one or more storage controllers.

19. A method of managing a plurality of storage backplanes, each storage backplane configured to interface with one or more hard disk drives, the method comprising:
communicating with one or more storage controllers by a baseboard management controller, wherein the baseboard management controller comprises a virtualized storage enclosure processor, and wherein the baseboard management controller includes:
an interface to communicate with at least two storage backplanes, wherein the interface receives a value of the one or more cable select lines; and
a processor that executes one or more commands to:
communicate with at least one of the one or more storage controllers using a storage enclosure services protocol;
detect and store a status associated with each of the one or more cable select lines, wherein the status is received from the one or more storage controllers;
detect the presence of one or more hard disk drives in the interfaced storage backplane by accessing a first register communicably coupled to the interfaced storage backplane; and
send an alert based, at least in part, on the status.

20. The method of claim 19, wherein the processor further executes the one or more commands to:

control, by the interface, a register to select one or more hard disk present signals; and read and store the selected one or more hard disk present signals.

\* \* \* \* \*